United States Patent
Zhou et al.

(10) Patent No.: US 10,011,737 B2
(45) Date of Patent: Jul. 3, 2018

(54) CURABLE POLYESTER POLYOLS AND THEIR USE IN THERMOSETTING SOFT FEEL COATING FORMULATIONS

(71) Applicant: Eastman Chemical Company, Kingsport, TN (US)

(72) Inventors: Jianhui Zhou, Kingsport, TN (US); Leslie Taylor Baker, Gate City, VA (US)

(73) Assignee: Eastman Chemical Company, Kingsport, TN (US)

( * ) Notice: Subject to any disclaimer, the term of this patent is extended or adjusted under 35 U.S.C. 154(b) by 30 days.

(21) Appl. No.: 15/078,537

(22) Filed: Mar. 23, 2016

(65) Prior Publication Data
US 2017/0275492 A1    Sep. 28, 2017

(51) Int. Cl.
*C09D 169/00*    (2006.01)

(52) U.S. Cl.
CPC ............................. *C09D 169/005* (2013.01)

(58) Field of Classification Search
CPC ...... C08L 67/03; C08G 63/127; C09D 169/00
USPC ................................................. 524/539, 315
See application file for complete search history.

(56) References Cited

U.S. PATENT DOCUMENTS

| | | | |
|---|---|---|---|
| 2,891,930 A | 6/1959 | Caldwell et al. |
| 3,018,272 A | 1/1962 | Griffing et al. |
| 3,033,822 A | 5/1962 | Kibler et al. |
| 3,075,952 A | 1/1963 | Coover, Jr. et al. |
| 3,108,083 A | 10/1963 | Laganis |
| 3,216,884 A | 11/1965 | O'Donnell |
| 3,227,764 A | 1/1966 | Martin et al. |
| 3,312,645 A | 4/1967 | George et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,528,947 A | 9/1970 | Lappin et al. |
| 3,538,187 A | 11/1970 | Feltzen |
| 3,734,874 A | 5/1973 | Kibler et al. |
| 3,772,227 A | 11/1973 | Kapalko et al. |
| 3,779,993 A | 12/1973 | Kibler et al. |
| 3,789,044 A | 1/1974 | Taft et al. |
| 3,800,004 A | 3/1974 | Sherwood et al. |
| 3,856,830 A | 12/1974 | Kuehn |
| 4,054,681 A | 10/1977 | Brüning et al. |
| 4,074,061 A | 2/1978 | Musser |
| 4,076,766 A | 2/1978 | Simms |
| 4,119,680 A | 10/1978 | Vachon |
| 4,120,847 A | 10/1978 | Culbertson |
| 4,196,109 A | 4/1980 | Laganis et al. |
| 4,264,671 A | 4/1981 | Gillern et al. |
| 4,267,279 A | 5/1981 | Howell |
| 4,299,933 A | 11/1981 | McConnell et al. |
| 4,304,901 A | 12/1981 | O'Neill et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |
| 4,433,119 A | 2/1984 | Brode et al. |
| 4,480,077 A | 10/1984 | Hefner, Jr. |
| 4,525,504 A | 6/1985 | Nelson et al. |
| 4,525,544 A | 6/1985 | Morris et al. |
| 4,581,093 A | 4/1986 | Noyes et al. |
| 4,585,854 A | 4/1986 | Tung et al. |
| 4,698,391 A | 10/1987 | Yacobucci et al. |
| 4,716,200 A | 12/1987 | Berghoff |
| 4,724,173 A | 2/1988 | Rockett et al. |
| 4,737,551 A | 4/1988 | Dervan et al. |
| 4,751,267 A | 6/1988 | Berghoff |
| 4,771,101 A | 9/1988 | Pruett et al. |
| 4,859,760 A | 8/1989 | Light, Jr. et al. |
| 4,910,292 A | 3/1990 | Blount |
| 4,939,233 A | 7/1990 | Jenkins et al. |
| 4,959,259 A | 9/1990 | Guilbaud |
| 5,017,679 A | 5/1991 | Chang et al. |

(Continued)

FOREIGN PATENT DOCUMENTS

BE    615850    7/1962
CA    740050 A    8/1966

(Continued)

OTHER PUBLICATIONS

Notice of Allowance dated Sep. 8, 2016 received in co-pending U.S. Appl. No. 14/540,490.
Notice of Allowance dated Dec. 30, 2016 received in co-pending U.S. Appl. No. 14/540,490.
International Search Report and Written Opinion for PCT/US2016/32646 dated Aug. 16, 2016.
International Search Report and Written Opinion for PCT/US16/52810 dated Dec. 15, 2016.
International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.

(Continued)

*Primary Examiner* — Deve E Valdez
(74) *Attorney, Agent, or Firm* — Matthew W. Smith

(57) ABSTRACT

A soft feel curable polyester composition comprising the residues of a 2,2,4,4-tetraalkylcyclobutane-1,3-diol, a $C_2$-$C_{20}$ diol other than 2,2,4,4-tetraalkylcyclobutane-1,3-diol, a $C_2$-$C_{20}$ polyol, an alicyclic diacid and an acyclic aliphatic diacid, wherein said curable polyester contains at least 90 mole percent of aliphatic diacid residues, based on the total moles of diacid residues, and wherein said curable polyester has a hydroxyl number of about 100 to about 250 mgKOH/g, an acid number of 0 to about 30 mgKOH/g, and a number average molecular weight of about 500 to about 10,000 g/mole, a soft segment polyol, an isocyanate crosslinker and a solvent or a solvent mixture.

17 Claims, No Drawings

(56) References Cited

U.S. PATENT DOCUMENTS

| | | | |
|---|---|---|---|
| 5,023,367 A | 6/1991 | Calbo, Jr. et al. |
| 5,025,086 A | 6/1991 | Blount, Jr. et al. |
| 5,097,006 A | 3/1992 | Kapilow et al. |
| 5,124,388 A | 6/1992 | Pruett et al. |
| 5,160,792 A | 11/1992 | Barbee et al. |
| 5,218,042 A | 6/1993 | Kuo et al. |
| 5,245,002 A | 9/1993 | Kuo |
| 5,254,637 A | 10/1993 | Witzeman et al. |
| 5,256,759 A | 10/1993 | Kuo |
| 5,256,761 A | 10/1993 | Blount, Jr. |
| 5,288,820 A | 2/1994 | Rector, Jr. et al. |
| 5,290,631 A | 3/1994 | Fleury et al. |
| 5,306,567 A | 4/1994 | Kuo et al. |
| 5,321,118 A | 6/1994 | Hubbs et al. |
| 5,326,820 A | 7/1994 | Hoffmann et al. |
| 5,344,872 A | 9/1994 | Debord et al. |
| 5,349,026 A | 9/1994 | Emmons et al. |
| 5,369,210 A | 11/1994 | George et al. |
| 5,371,148 A | 12/1994 | Taylor et al. |
| 5,393,609 A | 2/1995 | Chang et al. |
| 5,393,840 A | 2/1995 | Kuo |
| 5,393,849 A | 2/1995 | Srinivasan et al. |
| 5,397,641 A | 3/1995 | Moens et al. |
| 5,416,187 A | 5/1995 | Kuo et al. |
| 5,439,988 A | 8/1995 | Moens et al. |
| 5,453,464 A | 9/1995 | Witzeman et al. |
| 5,464,909 A | 11/1995 | Chang et al. |
| 5,498,668 A | 3/1996 | Scott |
| 5,541,268 A | 7/1996 | Fenn et al. |
| 5,554,701 A | 9/1996 | Chang et al. |
| 5,596,037 A | 1/1997 | Moens et al. |
| 5,596,049 A | 1/1997 | Gallucci et al. |
| 5,646,237 A | 7/1997 | George et al. |
| 5,654,347 A | 8/1997 | Khemani et al. |
| 5,663,266 A | 9/1997 | Taylor et al. |
| 5,696,176 A | 12/1997 | Khemani et al. |
| 5,852,120 A | 12/1998 | Bederke |
| 5,919,873 A | 7/1999 | Irving |
| 5,932,641 A | 8/1999 | Blanchard et al. |
| 5,955,565 A | 9/1999 | Morris et al. |
| 5,993,975 A | 11/1999 | Tanaka et al. |
| 6,087,464 A | 7/2000 | Swarup et al. |
| 6,120,851 A | 9/2000 | Borgholte et al. |
| 6,184,311 B1 | 2/2001 | O'Keeffe et al. |
| 6,211,309 B1 | 4/2001 | McIntosh et al. |
| 6,248,843 B1 | 6/2001 | Panandiker et al. |
| 6,255,366 B1 | 7/2001 | Adams et al. |
| 6,265,072 B1 | 7/2001 | Fagerburg |
| 6,423,816 B1 | 7/2002 | Wamprecht et al. |
| 6,444,781 B1 | 9/2002 | Kuo et al. |
| 6,780,523 B2 | 8/2004 | Kuo et al. |
| 6,841,604 B2 | 1/2005 | Bayer et al. |
| 6,887,937 B1 | 5/2005 | Vandevoorde et al. |
| 6,992,133 B2 | 1/2006 | Yokoyama et al. |
| 6,995,194 B2 | 2/2006 | Moens et al. |
| 7,087,672 B2 | 8/2006 | Yuan et al. |
| 7,141,625 B2 | 11/2006 | Komazaki et al. |
| 8,163,850 B2 | 4/2012 | Marsh et al. |
| 8,168,721 B2 | 5/2012 | Marsh et al. |
| 8,324,316 B2 | 12/2012 | Powell et al. |
| 8,449,960 B2 | 5/2013 | Skillman et al. |
| 8,492,465 B2 | 7/2013 | Seibold et al. |
| 8,519,055 B2 | 8/2013 | Marsh et al. |
| 8,524,834 B2 | 9/2013 | Marsh et al. |
| 8,580,872 B2 | 11/2013 | Kuo et al. |
| 8,663,765 B2 | 3/2014 | Skillman et al. |
| 9,029,460 B2 | 5/2015 | Marsh et al. |
| 9,029,461 B2 | 5/2015 | Marsh et al. |
| 9,034,964 B2 | 5/2015 | Kuo et al. |
| 9,090,741 B2 | 7/2015 | Morschhaeuser et al. |
| 9,096,772 B2 | 8/2015 | Lespinasse et al. |
| 9,200,177 B2 | 12/2015 | Young et al. |
| 2001/0051706 A1 | 12/2001 | George et al. |
| 2002/0086154 A1 | 7/2002 | Miller et al. |
| 2002/0103329 A1 | 8/2002 | Koldijk et al. |
| 2003/0083425 A1 | 5/2003 | Morimoto et al. |
| 2003/0113462 A1 | 6/2003 | Hirose et al. |
| 2003/0205852 A1 | 11/2003 | Porter |
| 2004/0024140 A1 | 2/2004 | Fujita et al. |
| 2004/0087736 A1 | 5/2004 | Wu et al. |
| 2005/0176859 A1 | 8/2005 | Tinkl et al. |
| 2006/0079650 A1 | 4/2006 | Stevenson et al. |
| 2006/0286383 A1 | 12/2006 | Gilmer |
| 2007/0020557 A1 | 1/2007 | Yao et al. |
| 2007/0092746 A1 | 4/2007 | Wayton et al. |
| 2007/0232778 A1 | 10/2007 | Moody et al. |
| 2007/0276065 A1 | 11/2007 | Barton et al. |
| 2008/0092776 A1 | 4/2008 | Stock et al. |
| 2008/0135060 A1 | 6/2008 | Kuo et al. |
| 2008/0139687 A1 | 6/2008 | Woods et al. |
| 2009/0047524 A1 | 2/2009 | Yaoi et al. |
| 2009/0110843 A1 | 4/2009 | Halahmi et al. |
| 2010/0159176 A1 | 6/2010 | Hale et al. |
| 2010/0204363 A1 | 8/2010 | Marsh et al. |
| 2010/0204388 A1 | 8/2010 | Marsh et al. |
| 2010/0204392 A1* | 8/2010 | Marsh ............ C08G 18/423 524/539 |
| 2010/0204401 A1 | 8/2010 | Marsh et al. |
| 2010/0204413 A1 | 8/2010 | Powell et al. |
| 2010/0297422 A1 | 11/2010 | Lucas |
| 2011/0232002 A1 | 9/2011 | Wiessner |
| 2011/0315591 A1 | 12/2011 | Lespinasse et al. |
| 2012/0101187 A1 | 4/2012 | Kuo et al. |
| 2012/0172520 A1 | 7/2012 | Marsh et al. |
| 2012/0202920 A1 | 8/2012 | Marsh et al. |
| 2012/0264669 A1 | 10/2012 | Cristobal et al. |
| 2013/0023604 A1 | 1/2013 | Kuo et al. |
| 2013/0072628 A1 | 3/2013 | Crawford et al. |
| 2013/0296470 A1 | 11/2013 | Marsh et al. |
| 2013/0296488 A1 | 11/2013 | Marsh et al. |
| 2013/0324640 A1 | 12/2013 | Parish |
| 2014/0018496 A1 | 1/2014 | Kuo et al. |
| 2014/0128265 A1 | 5/2014 | Wacker |
| 2014/0256852 A1 | 9/2014 | Vandezande et al. |
| 2014/0296406 A1 | 10/2014 | Marsh et al. |
| 2014/0296407 A1 | 10/2014 | Marsh et al. |
| 2014/0303283 A1 | 10/2014 | Ding et al. |
| 2014/0303303 A1* | 10/2014 | Benson ............ C09D 5/4465 524/407 |
| 2014/0348776 A1 | 11/2014 | Palmer, Jr. et al. |
| 2015/0034522 A1 | 2/2015 | Itou et al. |
| 2015/0099827 A1 | 4/2015 | Hagiwara et al. |
| 2015/0099837 A1 | 4/2015 | Argyropoulos et al. |
| 2016/0115274 A1 | 4/2016 | Kuo et al. |
| 2016/0115345 A1 | 4/2016 | Kuo et al. |
| 2016/0115347 A1 | 4/2016 | Kuo et al. |
| 2016/0115348 A1 | 4/2016 | Kuo et al. |

FOREIGN PATENT DOCUMENTS

| | | |
|---|---|---|
| CA | 2 111 927 A1 | 6/1994 |
| EP | 1 273 626 A1 | 1/2003 |
| EP | 1 647 564 | 4/2006 |
| EP | 2365036 A1 | 9/2011 |
| GB | 1 044 015 | 9/1966 |
| GB | 1 115 189 A | 5/1968 |
| GB | 1 130 558 | 10/1968 |
| GB | 2 025 998 B | 10/1982 |
| JP | 03-038281 | 2/1991 |
| JP | 08-073781 | 3/1996 |
| JP | 09-003341 | 1/1997 |
| JP | 2002-235038 | 8/2002 |
| JP | 2004-339493 A | 12/2004 |
| JP | 2006-233068 | 9/2006 |
| WO | WO 93/04125 | 3/1993 |
| WO | WO 94/01506 | 1/1994 |
| WO | WO 94/12557 | 6/1994 |
| WO | WO 95/01407 | 1/1995 |
| WO | WO 96/33229 | 10/1996 |
| WO | WO 01/48097 A1 | 7/2001 |
| WO | WO 02/066541 A1 | 8/2002 |
| WO | WO 2006/083343 | 8/2006 |
| WO | WO 2006/138198 | 12/2006 |
| WO | WO 2007/001567 | 1/2007 |

(56) References Cited

FOREIGN PATENT DOCUMENTS

| WO | WO 2007/001571 A1 | 1/2007 |
|---|---|---|
| WO | WO 2007/078851 | 7/2007 |
| WO | WO 2009/085097 A1 | 7/2009 |
| WO | WO 2009/156457 A1 | 12/2009 |
| WO | WO 2013/098218 A1 | 7/2013 |
| WO | WO 2014/203857 A1 | 12/2014 |
| WO | WO 2015/156094 A1 | 10/2015 |

OTHER PUBLICATIONS

International Search Report and Written Opinion for PCT/US2010/000216 dated Mar. 19, 2010.
International Search Report and Written Opinion for PCT/US2015/057524 dated Jun. 17, 2016.
Anonymous, "The Use of Cycloaliphatic Diacids and Anhydrides as Monomers for Polyester Polymers to Improve their Compatibility with Acrylic Polymers", Research Disclosure, 360, (1994), pp. 229-230.
Couchman, P. R.; "Compositional Variation of Glass-Transition Temperatures. 2. Application of the Thermodynamic Theory to Compatible Polymer Blends"; Macromolecules 1978, 11(6); pp. 1156-1161.
Heidt, et al., "Florida weathering of Isophthalic Acid-Based, Melamine-Crosslinked Polyester Coatings", Proceedings of the Twenty-Seventh International Waterborne, High Solids and Powder Coatings Symposium (2000), $27^{th}$ 295-307.
Husbands, M.J., et al., "Polyester Resubgs", A Manual of Resins for Surface Coatings, vol. III, pp. 63-167.
Jorissen, D.A., et al., "Higher Solids Polyurethane Coatings", Proceedings of the International Waterborne, High-Solids and Powder Coatings Symposium, (1992), $19^{th}$ ed. pp. 182-195.
"Coating Processes (Powder Technology)"; Kirk-Othmer Encyclopedia of Chemical Technology, $4^{th}$ Edition, vol. 6, p. 641.
Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.
Oldring, P.K.T., et al., "Vinyl and Acrylic Monomers", A Manual of Resins for Surface Coatings, vol. II, pp. 121-210.
Oldring, P.K.T. et al.; Resins for Surface Coatings; vol. III; pp. 63-167; SITA Technology; London, UK; 1987.
Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Vandevoorde, P., et al. "Making solid gains Novel acrylic and polyester polyols reduce VOCs in solventborne urethanes", European Coatings Journal (2005) (9) pp. 22-24, 26-29.
Wicks, Zeno Jr., et al., "Polyester Resings", Organic Coatings Science and Technology, $2^{nd}$ ed., 13, (1999), p. 246-257.
Co-pending U.S. Appl. No. 14/026,424, filed Sep. 13, 2013, Kuo et al.
Non-Final Office Action dated Nov. 16, 2015 received in co-pending U.S. Appl. No. 14/026,424.
Final Office Action dated Mar. 3, 2016 received in co-pending U.S. Appl. No. 14/026,424.
Co-pending U.S. Appl. No. 15/172,288, filed Jun. 3, 2016, Kuo et al.
Co-pending U.S. Appl. No. 14/524,509, filed Oct. 27, 2014, Kuo et al.
Non-Final Office Action dated Sep. 28, 2015 received in co-pending U.S. Appl. No. 14/524,509.
Notice of Allowance dated Mar. 10, 2016 received in co-pending U.S. Appl. No. 14/524,509.
Notice of Allowance dated Jun. 10, 2016 received in co-pending U.S. Appl. No. 14/524,509.
Co-pending U.S. Appl. No. 14/524,514, filed Oct. 27, 2014, Kuo et al.
Non-Final Office Action dated May 6, 2016 received in co-pending U.S. Appl. No. 14/524,514.
Co-pending U.S. Appl. No. 14/540,490, filed Nov. 13, 2014, Kuo et al.
Non-Final Office Action dated May 12, 2016 received in co-pending U.S. Appl. No. 14/540,490.
Co-pending U.S. Appl. No. 14/683,278, filed Apr. 10, 2015, Kuo et al.
Non-Final Office Action May 4, 2016 received in co-pending U.S. Appl. No. 14/683,278.
Co-pending U.S. Appl. No. 14/716,027, filed May 19, 2015, Zhou et al.
Co-pending U.S. Appl. No. 14/865,112, filed Sep. 25, 2015, Inglefield et al.
Co-pending U.S. Appl. No. 14/922,846, filed Oct. 26, 2016, Kuo et al.
International Search Report and Written Opinion for PCT/US2015/057529 dated Jan. 27, 2016.
International Search Report and Written Opinion for PCT/US2012/045357 dated Sep. 24, 2012.
ASTM D522; Standard Test Methods for Mandrel Bend Test of Attached Organic Coatings.
ASTM D1639-90; Standard Test Method for Acid Value of Organic Coating Materials.
ASTM D2794; Standard Test Method for Resistance of Organic Coatings to the Effect of Rapid Deformation (Impact).
ASTM D3359-09$^{e2}$; Standard Test Methods for Measuring Adhesion by Tape Test.
ASTM D3363; Standard Test Method for Film Hardness by Pencil Test.
ASTM D3418; Standard Test Method for Transition Temperatures and Enthalpies of Fusion and Crystallization of Polymers by Differential Scanning Calorimetry.
ASTM D4274-11; Standard Test Methods for Testing Polyurethane Raw Materials: Determination of Hydroxyl Numbers of Polyols.
ASTM D4287; Standard Test Method for High-Shear Viscosity Using a Cone/Plate Viscometer.
ASTM D4366; Standard Test Method for Hardness of Organic Coatings by Pendulum Damping Tests.
ASTM D4752-10; Standard Practice for Measuring MEK Resistance of Ethyl Silicate (Inorganic) Zinc-Rich Primers by Solvent Rub.
ASTM D6279; Standard Test Method for Rub Abrasion Mar Resistance of High Gloss Coatings.
Biedermann et al.; "Phenolic resins for can coatings: II. Resoles based on cresol/phenol mixtures of tert. butyl phenol"; LWT—Food Science and Technology; 39; (2006); pp. 647-659 (Elsevier).
Narayan et al.; "Properties of acetoacetylated hydroxylated polyesters based polyurethane coatings"; Progress in Organic Coatings; 45; (2002); pp. 59-67.
The Chemisty of Polyurethane Coatings, Technical Publication, p. 20, by Bayer Material Science, 2005.
Witzeman et al.; "Comparison of Methods for the Preparation of Acetoacetylated Coating Resins"; Journal of Coatings Technology; vol. 62; No. 789; Oct. 1990; pp. 101-112.
Zhang, Musan et al.; "Tailoring adhesive performance of sulfonated segmented block copolymers"; Database CA [Online]; Chemical Abstracts Service; XP002682877.
Notice of Allowance dated Mar. 8, 2017 received in co-pending U.S. Appl. No. 14/524,514.
Non-Final Office Action dated Feb. 7, 2017 received in co-pending U.S. Appl. No. 14/716,027.
Non-Final Office Action dated Apr. 21, 2017 received in co-pending U.S. Appl. No. 14/865,112.
ASTM D3281; Standard Test Method for Formability of Attached Organic Coatings with Impact-Wedge Bend Apparatus.
ASTM D5402-15; Standard Practice for Assessing the Solvent Resistance of Organic Coatings Using Solvent Rubs.
Co-pending U.S. Appl. No. 15/435,353, filed Feb. 17, 2017, Dziczkowski et al.
Dyab et al.; "Non-Aqueous Emulsions Stabilised by Nonionic Nonyl Phenol Ethoxylate Reactive Polymerisable Surfactants"; International Journal of Electrochemical Science; 8; 2013; pp. 9868-9885.

(56) References Cited

OTHER PUBLICATIONS

Stepan Product Bulletin for MAKON® TSP-12, TSP-16, TSP-20, TSP-25, TSP-40 & TSP-60.
Vogel et al.; "Near-Zero VOC Waterborne Alkyd Dispersions with Solventborne Alkyd Performance"; CoatingsTech; Jun. 2016; pp. 29-39.
International Search Report and Written Opinion for PCT/US2017/018563 dated Apr. 6, 2017.
Non-Final Office Action dated Apr. 27, 2017 received in co-pending U.S. Appl. No. 15/172,288.
International Search Report and Written Opinion for PCT/US2017/022885 dated May 25, 2017.
Co-pending U.S. Appl. No. 15/701,965, filed Sep. 12, 2017, Inglefield et al.
Final Office Action dated Oct. 12, 2017 received in co-pending U.S. Appl. No. 14/716,027.

\* cited by examiner

CURABLE POLYESTER POLYOLS AND THEIR USE IN THERMOSETTING SOFT FEEL COATING FORMULATIONS

BACKGROUND OF THE INVENTION

This invention relates to soft feel coatings and in particular to curable polyester polyols for use in thermosetting soft feel coatings.

FIELD OF THE INVENTION

Soft feel coatings are commonly applied to plastic parts to improve comfort and aesthetic value and are also widely used in automotive interior parts as well as consumer electronics. A soft touch coating can impart a range of touch sensations, for example, a velvety feel, a silky feel, or a rubbery feel, to an otherwise hard substrate. In addition to its unique tactile touch property, the coating must function consistently over the desired service time demanded in the market where daily interaction between the users and the coated surfaces occur. Apart from robust adhesion to the coated surface, the coating must perform well when exposed to common chemicals, such as human sweat, cosmetics, sun screens and food items.

Many chemicals, including those found in sunscreen lotions and insect repellants, can further soften soft feel coatings, and will migrate through the coating and into the underlying plastic, causing adhesion loss of the coating to the plastic substrate and, in some instances, damage to the underlying plastic substrate.

There is a fine balance between soft touch and chemical resistance. An increase in cross link density and film hardness typically would improve chemical resistance including sunscreen resistance, but can impact the soft touch feeling of the coating, thereby decreasing the comfort and aesthetic value of the soft feel coating.

This invention relates to a thermosetting soft feel coating composition comprised of at least a branched polyester polyol, a soft segment polyol and a cross linker. The superior chemical resistance of these polyesters provides improved sunscreen lotion resistance in soft feel coating formulations while maintaining the desired comfort and aesthetic value of the soft feel coatings.

SUMMARY OF THE INVENTION

This invention relates to soft feel coatings and in particular to curable polyester polyols for use in thermosetting soft feel coatings In certain embodiments, the present invention is directed to a coating composition comprising:

A) a cureable aliphatic polyester composition comprising the residues of:
  a) 2,2,4,4-tetraalkylcyclobutane-1,3-diol represented by the structure

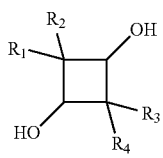

wherein $R_1$, $R_2$, $R_3$, and $R_4$ each independently are $C_1$ to $C_8$ alkyls;

b) a $C_2$-$C_{20}$ diol other than 2,2,4,4-tetraalkylcyclobutane-1,3-diol;
  c) a $C_2$-$C_{20}$ polyol;
  d) an alicyclic diacid; and
  e) an acyclic aliphatic diacid; and wherein said curable polyester contains at least 90 mole percent of aliphatic diacid residues, based on the total moles of diacid residues, and wherein said curable polyester has a hydroxyl number of about 100 to about 250 mgKOH/g, an acid number of 0 to about 30 mgKOH/g, and a number average molecular weight of about 500 to about 10,000 g/mole:

B) a soft segment polyol;
C) an isocyanate crosslinker; and
D) a solvent.

DESCRIPTION OF THE INVENTION

For purposes of the following detailed description, while attempts have been made to be precise, the numerical values and ranges described herein should be considered to be approximations (even when not qualified by the term "about"). These values and ranges may vary from their stated numbers depending upon the desired properties sought to be obtained by the present invention as well as the variations resulting from the standard deviation found in the measuring techniques. Moreover, it is to be understood that any numerical range recited herein is intended to include all sub-ranges that are subsumed therein. For example a range of 10 to 70 is intended to include all sub ranges between 10 and 70 and including the recited minimum value of 10 and the maximum value of 70, that is having a minimum value equal to or greater than 10 and a maximum value equal to or less than 70. Also, a range associated with chemical substituent groups such as, for example, "$C_1$ to $C_5$ diols", is intended to specifically include and disclose $C_1$, $C_2$, $C_3$, $C_4$ and $C_5$ diols.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identified ingredient or residue. Accordingly, the terms "containing", "having" or "including" are intended to be synonymous and may be used interchangeably with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

The term "curable aliphatic polyester", as used herein, is synonymous with the term "resin" and is intended to mean a thermosetting surface coating polymer prepared by the polycondensation of one or more acid components and hydroxyl components.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the terms "diacid" is intended to include dicarboxylic acids and any derivative of a dicarboxylic acid, including its associated acid halides, esters, half-esters, salts, half-salts, anhydrides, and mixtures thereof, useful in a polycondensation process with a diol to make a curable, aliphatic polyester.

The term "aliphatic" is intended to have its common meaning as would be understood by persons having ordinary skill in the art, that is, acyclic or cyclic, saturated or unsaturated carbon compounds, excluding benzenoid or other aromatic systems. The term "acyclic aliphatic diacid" is intended to mean an open-chain aliphatic dicarboxylic acid compound, its diester derivative, its anhydride, or a combination thereof. The term "alicyclic diacid" is intended to mean a cyclic aliphatic dicarboxylic acid compound, its diester derivative, its anhydride, or a combination thereof. The term "aliphatic polyester", as used herein, is understood to mean a polyester that contains 90 mole percent or greater aliphatic diacid or diol residues, based on the total moles of diacid or diol residues. Small amounts, such as less than 10 mole %, or less than 9 mole %, or less than 8 mole %, or less than 5 mole %, or less than 3 mole %, or less than 2 mole %, or less than 1 mole % of aromatic dicarboxylic acids residues or aromatic diol residues also may be present in the curable, aliphatic polyester. Desirably, the curable, aliphatic polyester is essentially free, i.e., having less than 1 mole % of aromatic diacid and/or aromatic diol residues.

In one embodiment, this invention provides a curable polyester comprising the residues of:
a) 2,2,4,4-tetraalkylcyclobutane-1,3-diol (TACD) in an amount of about 30 to about 90 mole %, based on the total moles of the diols,
b) a diol other than TACD in an amount of about 10 to 70 mole % based on the total moles of the diols,
c) a polyol in an amount of 5 to 60 mole %, based on the total moles of the diols and polyol,
d) an alicyclic diacid in an amount of about 70 to about 100 mole %, based on the total moles of the diacids, and
e) an acyclic aliphatic diacid in an amount of about 0 to 30 mole %, based on the total moles of the diacids,
wherein said curable polyester contains at least 90 mole % of aliphatic diacid residues, based on the total moles of diacid residues, and wherein said curable polyester has a hydroxyl number of about 100 to about 250 mgKOH/g, an acid number of 0 to about 30 mgKOH/g, and a number average molecular weight of about 500 to about 10,000 g/mole.

TACD is a diol and can be represented by the general structure:

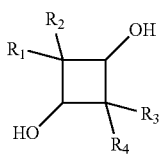

wherein $R_1$, $R_2$, $R_3$, and $R_4$ each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

The diols (b) other than TACD have 2 hydroxyl groups and can be branched or linear, saturated or unsaturated, aliphatic or cycloaliphatic $C_2$-$C_{20}$ compounds, the hydroxyl groups being primary, secondary, and/or tertiary. Examples of diols (b) include 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid (dimethylolpropionic acid).

In some embodiments, the diol (b) is 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. In other embodiments, at least one of the diols is neopentyl glycol.

In some embodiments, TACD (a) is present in an amount of about 30 to about 90 mole % and the diol (b) in an amount of about 10 to 70 mole %, both based on the total moles of the diols, (a) and (b). In other embodiments, TACD (a) is present in about 40 to about 80 mole % and the diol (b) in about 20 to about 60 mole %.

The polyol (c) having 3 or more hydroxyl groups can be branched or linear, saturated or unsaturated, aliphatic or cycloaliphatic $C_2$-$C_{20}$ compounds, the hydroxyl groups being primary, secondary, and/or tertiary. In some embodiments at least two of the hydroxyl groups are primary. In yet other embodiments, the polyols are hydrocarbons and do not contain atoms other than hydrogen, carbon and oxygen. Examples of the polyol include 1,1,1-trimethylolpropane (TMP), 1,1,1-trimethylolethane, glycerin, pentaerythritol, erythritol, threitol, dipentaerythritol, sorbitol, mixtures thereof, and the like. In another embodiment, the polyol is TMP.

In some embodiments, the polyol (c) is present in an amount of about 5 to about 60 mole % based on the total moles of the diols and the polyol, (a), (b), and (c). In other embodiments, the polyol is present in about 10 to about 50 mole % based on the total moles of the diols and the polyol, (a), (b), and (c).

The alicyclic diacid (d) is a cyclic aliphatic dicarboxylic acid compound, its diester derivative, its anhydride, or a combination thereof. Suitable alicyclic diacid compounds include compounds having two carboxylic acid groups, their diester derivatives, and their anhydrides. The dicarboxylic acid compounds are capable of forming ester linkages with diol or polyol compounds. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

Suitable alicyclic diacids include, but are not limited to, 1,4-cyclohexanedicarboxylic acid, 1,3-cyclohexanedicarboxylic acid, hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof. In some embodiments HHPA is the alicyclic diacid.

The acyclic aliphatic diacid (e) is an open-chain aliphatic dicarboxylic acid compound, its diester derivative, its anhydride, or a combination thereof. Examples of acyclic aliphatic diacids include adipic acid, maleic anhydride, maleic acid, fumaric acid, itaconic anhydride, itaconic acid, citraconic anhydride, citraconic acid, dodecanedioic acid, sebacic acid, azelaic acid, and the like. In some embodiments adipic acid is the aliphatic diacid (e).

In some embodiments, the alicyclic diacid (d) is present in an amount of about 70 to about 100 mole % and the acyclic aliphatic diacid (e) is in an amount of about 0 to about 30 mole %, both based on the total moles of the diacids, (d) and (e). In some embodiments, the alicyclic diacid (d) is above 80% and the acyclic aliphatic diacid (e) is less than 20%, both based on the total moles of the diacids, (d) and (e).

The hydroxyl number of the curable polyester of the present invention may be from about 100 to about 250, from about 120 to about 230, or from about 150 to about 200 mgKOH/g. The acid number may be from 0 to about 30, from about 3 to about 20, from 3 to about 15, or from 5 to about 10 mgKOH/g.

The number average molecular weight (Mn) of the curable polyester of the present invention may be from 500 to 10,000, from 800 to 6,000, or from 1,000 to 3,000 g/mole. The weight average molecular weight (Mw) of the curable polyester of the present invention may be from 1,000 to 10,000, from 1,500 to 6,000, or from 2,000 to 4,000 g/mole. Molecular weights are measured by gel permeation chromatography (GPC) using polystyrene equivalent molecular weight.

The glass transition temperature (Tg) of the curable polyester of the present invention may be from 0° C. to 55° C., from 5° C. to 45° C., or from 10° C. to 40° C.

In another embodiment, this invention provides a thermosetting soft feel coating composition comprising:
  i. the curable polyester of the present invention,
  ii. a soft segment polyol that could be polycarbonate diol (PCD), polytetoramethylene glycol (PTMG), polycaprolactone or the mixture of these soft segment polyols,
  iii. a crosslinker, and
  iv. an organic solvent.

In some embodiments, the curable polyester (i) is desirable present in an amount from 10 to 50 weight %, or from 15 to 45%; the soft segment polyol (ii) is from 50 to 90 weight %, or from 55 to 85 weight %; and the crosslinker (iii) from 10 to 50 weight %, from 15 to 40 weight, based on the total weight of the polyols (i) and (ii), and crosslinker (iii).

The crosslinker may be an isocyanate isocyanurate type. Suitable isocyanates include, but are not limited to, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4''-triisocyanate, tetramethyl xylene diisocyanate, metaxylene diisocyanate, and polyisocyanates. There can also be employed isocyanate terminated adducts of diols and polyols, such as ethylene glycol, 1,4-butylene glycol, trimethylol propane, etc. These are formed by reacting more than one mole of a diisocyanate, such as those mentioned, with one mole of a diol or polyol to form a higher molecular weight isocyanate prepolymer with a functionality of 2 to 3. Examples include those isocyanate crosslinkers under the Desmodur and Mondur trade names from Bayer Material Science. Where isocyanates are used as crosslinkers. In some embodiments, the crosslinkers are aliphatic isocyanates, since they provide outdoor durability and color stability in the cured coating. Examples include 1,6-hexamethylene diisocyanate, 1,4-butylene diisocyanate, methylene bis (4-cyclohexyl isocyanate) and isophorone diisocyanate. Mixtures of isocyanate crosslinkers can also be employed. The example thermosetting soft feel coating formulations provided contain the triisocyanurate of 1,6-hexamethylene diisocyanate as the crosslinker.

Stoichiometric calculations for the polyester resin and isocyanate reaction are known to those skilled in the art and are described in The Chemistry of Polyurethane Coatings, Technical Publication p. 20, by Bayer Material Science, 2005. Theoretically, crosslinking between the polyester resin and isocyanate reaches maximum molecular weight and optimal properties associated with molecular weight when one equivalent of isocyanate (NCO) reacts with one equivalent of hydroxyl (OH), which is when the NCO to OH ratio is 1.0/1.0. It is common practice to use a small excess of isocyanate, about 5-10%, to allow for the likely consumption of isocyanate by moisture from the atmosphere, solvents and pigments. It is sometimes desirable to vary the NCO to OH ratio less than 1.0/1.0 to improve flexibility or greater than 1.0/1.0 for harder, more chemical resistant and more weather resistant coatings.

In another aspect, this invention further provides a curable coating composition further comprising one or more crosslinking catalysts. Useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, 1,8-diaza-bichloro[5,40]-undecene-7 N-methyl diethanolamine, N,N-dimethyl ethanolamine, N,N-diethyl cyclohexylamine, N,N,N'N'-tetramethyl-ethylene diamine, 1,4-diaza-bicyclo-[2,2,2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-1,3- butanediamine, 1,2-dimethylimidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metal organics, such as zinc octoate, phenyl mercuric propionate, lead octoate, lead naphthenate, and copper naphthenate. In some embidiments the catalyst is dibutyl tin dilaurate (DBTDL). In some embodiments the amount of catalyst will be about 0.01 to 5%, based on the total weight of the resin solids.

Additional additives that may be included in the composition described herein include UV inhibitors, wetting agents, flow agents, defoamers, flattening agents, rheology control agents, anti-settling, anti-sag agents and slip agents. In some embodiments, the coating compositions described herein may include a flattening agent. Flattening agents are generally small solid particles of material that are insoluble in water and are effective to reduce gloss. Preferably, the flattening agent particles have a size of from about 0.05 to about 10 microns, but may be present in clumps or agglomerates of up to about 50 microns. The flattening agent particles may be inorganic or organic. Examples of suitable inorganic flattening agents include silicates, such as talc, and various forms of silica, such as amorphous, aerogel, diatomaceous, hydrogel and fumed silicas. Examples of suitable organic flattening agents include insoluble urea-formaldehyde resins, polyethylene, polypropylene, cellulosic fibers and polyurethane/polyurea copolymers.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

If desired, the coating compositions can comprise other functional materials such as pigments, abrasion resistant particles, anti-oxidants, thixotropic agents and fillers. Examples of pigments include those generally recognized by persons of ordinary skill in the art of surface coatings. For example, the pigment may be a typical organic or inorganic pigment, especially those set forth in the Colour Index, 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Red 101 (red iron oxide), CI Pigment Yellow 42, CI Pigment Blue 15,15:1,15:2,15:3,15:4 (copper phthalocyanines); CI Pigment Red 49:1 and CI Pigment Red 57:1. Colorants such as, for example, phthalocyanine blue, molybdate orange, or carbon black also may be added to the coating composition.

In preparing the present coatings, the branched polyester, the soft segment polyols and the crosslinker can be dissolved or dispersed in a single solvent or a mixture of solvents. Any solvent that will enable the formulation to be coated on a substrate may be used, and these will be well known to the person skilled in the art. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The amount of organic solvent can be up to 85 wt. % based on the weight of the coating composition.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 μm), or 0.5 to 3, or 0.5 to 2, or 0.5 to 1 mils on the substrate. The coating can be cured at ambient (room) temperature or heated to a temperature of about 50° C. to about 230° C., or desirably from 50° C. to 100° C., for a time period that typically ranges about 5 to about 90 minutes and allowed to cool.

This invention can be further illustrated by the following examples, although it will be understood that these examples are included merely for purposes of illustration and are not intended to limit the scope of the invention.

EXAMPLES

The following examples are given to illustrate the invention. It should be understood, however, that the invention is not to be limited to the specific conditions or details described in these examples.

Preparation of the Curable Polyesters of the Present Invention and Also Comparative Polyester Example Curable polyesters of the present invention and comparative polyester example (Table 1) were prepared using a solvent process to help remove the water of esterification. The resins were prepared in a two-liter reaction kettle equipped with a heating mantle, mechanical stirrer, thermocouple, nitrogen blanket (0.6 scfh), oil-heated partial condenser (103° C.-105° C.), condensate trap, and water-cooled total condenser (15° C.). The condensate trap, kettle top and adapter from the kettle to the column were wrapped in aluminum foil and fiberglass tape to facilitate water removal. Stage 1 raw materials were charged to the reactor. Additional xylene (~30 g) was used to fill the condensate trap. The temperature was then increased from room temperature to 150° C. over ninety minutes to form a homogenous melt. Agitation (300 rpm) was started and the temperature increased to a maximum of 230° C. over 240 minutes. The Stage 2 TMP was added when half the theoretical condensate was collected. The reaction mixture was held at 230° C.

The acid number (abbreviated "AN"), hydroxyl number (abbreviated "OHN"), number average molecular weight (abbreviated "Mn"), weight average molecular weight (abbreviated "Mw), z-average molecular weight (abbreviated as "Mz"), molecular weight distribution polydispersity index (abbreviated "Mw/Mn"), glass transition temperature (abbreviated "Tg") and melt viscosity of the polyester resins are shown in Table 1.

Acid number was determined using ASTM method D 1639.

Hydroxyl number was determined by esterifying the resin with excess acetic anhydride in pyridine and then decomposing the unreacted anhydride with water. The resulting acetic acid is then titrated with a standard solution of KOH. The number of milligrams KOH which are equivalent to one gram of resin sample is reported as the hydroxyl number.

Number average molecular weight was determined by gel permeation chromatography (Agilent 1100 Series GPC-SEC system) with a refractive index detector and polystyrene standards.

Residual solvent remaining in the resin from processing can artificially lower the Tg measurement. To obtain a more accurate Tg, a resin sample was first subjected to preconditioning in an oven. About 0.3 g-0.5 g of resin was placed into a sample tin and heated to 150° C. The sample remained in the oven for 14-16 hours (overnight). The sample was then transferred to a differential scanning calorimeter (TA Instruments DSC Q2000 V24.9 Build 121). On the first heating cycle, the sample in the DSC chamber was cooled to −50° C. by liquid nitrogen and then heated from −50° C. to 140° C. at a rate of 20° C./min under nitrogen atmosphere. The sample was then quench cooled to −50° C. For the second heating cycle, the sample was heated under the same conditions as those used in the first heating cycle. The midpoint of the second heating cycle is reported as the Tg of the sample.

TABLE 1

The curable polyesters of the present invention and a comparative polyester example

| Polyester resin | Example PE 1 | Example PE 2 | Comparative PE 3 |
|---|---|---|---|
| Stage 1 | | | |
| TMCD[(a),(b)] | 510 | 408.1 | 750.1 |
| TMP[(c)] | 53 | 189.8 | 55.9 |
| HHPA[(d)] | 865.4 | 915 | 984.3 |
| Triphenylphosphite | 1.83 | 1.84 | 1.84 |
| Xylene process solvent | 18.29 | 18.44 | 18.68 |
| Stage 2 | | | |
| NPG[(a),(f)] | 368.3 | 147.4 | 0 |
| TMP | 53 | 189.8 | 55.8 |
| Fascat 4100 catalyst[(g)] | 1.84 | 1.84 | 1.84 |
| Determined Resin Properties | | | |
| AN, mg KOH/g resin | 4 | 9 | 10 |
| OHN, mg KOH/g resin | 154 | 157 | 130 |
| $M_z$ | 5526 | 7762 | 4200 |
| $M_w$ | 2602 | 3764 | 2310 |
| $M_n$ | 1190 | 1561 | 1100 |
| $M_w/M_n$ | 2.19 | 2.41 | 2.1 |
| $T_g$, ° C. | 26 | 36 | 8 |

[(a)]Add 0.25 wt. % glycol excess based on calculated charge weights
[(b)]2,2,4,4-tetramethyl-1,3-cyclobutanediol
[(c)]Trimethylolpropane
[(d)]Hexahydrophthalic anhydride
[(e)]Adipic acid
[(f)]2,2-Dimethyl-1,3-propanediol Thermosetting Soft Feel Coating Preparation and Evaluation:

Prepartion of Thermosetting Soft Feel Coatings

Thermosetting soft feel coatings were prepared by mixing the ingredients listed in Table 2. Polyester samples prepared in table 1 were pre-dissolved into butylacetate to form 75% solid solutions. Part A was first prepared by mixing the ingredients in listed order to form a uniform solution. The Part B was added to Part A and mixed to uniform solution before apply.

TABLE 2

Thermosetting monocoat formulation

| Ingredients | Example soft feel coating SF 1 | Comparative soft feel coating SF 2 | Comparative soft feel coating SF 3 |
|---|---|---|---|
| Part A | | | |
| Example PE2*[1] | 11.05 | | |
| Comparative PE3*[1] | | 11.40 | |
| Desmophen 670 BA*[2] | | | 10.70 |
| Desmophene C 1200*[3] | 19.15 | 19.15 | 20.00 |
| Acemat 3300*[4] | 4.31 | 4.31 | 4.31 |
| Baysilone OL-17(10% in xylene)*[5] | 1.29 | 1.29 | 1.29 |
| DBTDL Solution*[6] | 2.15 | 2.15 | 2.15 |
| Butyl Acetate | 25.50 | 25.50 | 25.50 |
| Xylene | 25.61 | 24.98 | 25.98 |
| EB acetate | 3.25 | 3.25 | 3.25 |
| Tinuvin 292 | 0.51 | 0.51 | 0.51 |
| Tinuvin 400 | 0.51 | 0.51 | 0.51 |
| Ceramat 258*[7] | 5.39 | 5.39 | 5.39 |
| Total | 98.73 | 98.45 | 99.60 |
| Part B: | | | |
| Desmodur N3390 | 10.45 | 9.66 | 9.40 |
| Total | 109.17 | 108.10 | 109.00 |
| NCO/OH | 1:1.15 | 1:1.15 | 1:1.15 |
| Matt agent/Binder | 0.12 | 0.12 | 0.12 |
| NV | 40.44 | 40.46 | 40.40 |

*[1]PE2 and PE 3 75% in butyl acetate
*[2]Desmophen 670 BA Branched PE polyol in BAC, OH content 3.5%
*[3]Desmophene C 1200 Liner Polycarbonate Polyester; OH content 1.7%
*[4]Acemat 3300 Silica matt agent Polyether modified polysiloxane from OMG
*[5]Baysilone OL-17 Borchers GmbH
*[6]DBTDL Solution 20% dibutyltin dilaurate in methyl propyl ketone
*[7]Ceramat 258 Oxidized HD polyethylene wax dispersion Evaluation of Thermosetting Soft Feel Coatings Plastic substrate Solvay Sequel 1440 which is made of thermoplastic polyolefin, in 4×12 inch size was used. The plastic substrates were pre-coated with a wash primer to improve adhesion. The wash primer was made by dissolving a chlorinated polyolefin CP-730 from Eastman Chemical Company into xylene to form a 15% solids solution. The DFT of the adhesion primer is about 5 microns.

The viscosity of the soft feel coatings were adjusted to 25 seconds measured by a number 4 Ford cup using aromatic 100 solvent. Coatings were spray-applied to pre-primered plastic substrates using a gravity fed Devilbiss gun. Target Dry Film Thickness (DFT) was 30 microns. A fifteen minute flash time was allowed and coatings were baked at 80° C. for 30 minutes. Cured panels were aged for 5 to 7 days at ambient temperature ahead of property testing.

Soft touch performance is critical to the comfort and aesthetic value of soft feel coatings, however, there is no test method developed for this test other than relying on tangible recognition of a human's hand comparing a test panel with a standard panel. For the sunscreen resistance testing, the test method described below was used.

A pencil hardness test per ASTM D3363 was conducted on the coated substrate panels and initial hardness was recorded.

The sunscreen lotion used was Neutrogena® Ultra Sheer® Dry-Touch sunscreen (SPF 45) available from Johnson and Johnson Corporation.

0.5 grams of Neutrogena sunscreen was evenly applied to 40×40 mm squares of coated substrate.

The panels were heated in an oven at 55 degree C. for 4 hours.

The Neutrogena cream was wiped off of the panels, and the panels were washed with water and dried at ambient conditions.

A second pencil hardness test was conducted on the panels and the result was recorded.

A visual assessment of the panels was done to determine if there was any change of color, gloss and appearance of the coating.

A 2 mm cross cut adhesion test using ASTM D3359 was performed.

Table 3 below shows the key test results of the soft feel coatings prepared in Table 2.

TABLE 3

Sunscreen resistance test results

| Test items | Example soft feel coating SF 1 | Comparative soft feel coating SF 2 | Comparative soft feel coating SF 3 |
|---|---|---|---|
| Soft touch performance | Good | Good | Good |
| Pencil hardness initial | HB* | HB | HB |
| Pencil hardness after sunscreen test | 2B | 3B | 3B |
| Pencil hardness rank drop | 2 | 3 | 3 |
| Cross hatch adhesion after test | Pass | Pass | Pass |
| Visual examination: | | | |
| Color changes | No | No | No |
| Gloss changes | No | No | No |
| Film appearance changes | No | Slightly swelled | Slightly swelled |

*Hardness order is 2H > H > HB > B > 2B > 3B

The invention has been described in detail with particular reference to preferred embodiments thereof, but it will be understood that variations and modifications can be effected within the spirit and scope of the invention.

We claim:

1. A curable coating composition comprising:
   A) a curable aliphatic polyester composition comprising the residues of:
   i. a hydroxyl component, said hydroxyl component comprising the residues of:
      a) from 30 to about 90 mole %, based on the total moles of a) and b) of 2,2,4,4-tetraalkylcyclobutane-1,3-diol represented by the structure

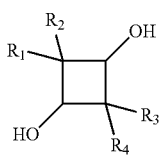

wherein R1, R2, R3, and R4 each independently are $C_1$ to $C_8$ alkyls;
      b) from 10 to 70 mole % based on the total moles of a) and b) of a $C_2$-$C_{20}$ diol other than 2,2,4,4-tetraalkylcyclobutane-1,3-diol;
      c) from 5 to 60 mole %, based on the total moles of a), b) and c) of a $C_2$-$C_{20}$ polyol;
   ii. a diacid component, said diacid component comprising the residues of:
      d) from 70 to about 100 mole %, based on the total moles of d) and e) of an alicyclic diacid; and
      e) from 0 to 30 mole %, based on the total moles of d) and e) of an acyclic aliphatic diacid; and
   wherein said curable polyester contains at least 90 mole percent of aliphatic diacid residues, based on the total moles of diacid residues, and wherein said curable polyester has a hydroxyl number of about 100 to about 250 mgKOH/g, an acid number of 0 to about 30 mgKOH/g, and a number average molecular weight of about 500 to about 10,000 g/mole;
   B) a polyol selected from polycarbonate diol, polytetramethylene glycol, or polycaprolactone;
   C) a crosslinker; and
   D) a solvent;
   wherein said curable polyester (A) is present in an amount from 10 to 50 weight %; said polyol (B) is present in an amount of from 50 to 90 weight %, said crosslinker (C) is present in an amount of from 10 to 50 weight % based on the total weight of said polyester (A), said polyol (B) and said crosslinker (C) in said coating composition.

2. The composition of claim 1 wherein said $C_1$ to $C_8$ alkyls on said 2,2,4,4-tetraalkylcyclobutane-1,3-diol are linear, branched, or a combination of linear and branched alkyls.

3. The composition of claim 1 wherein said 2,2,4,4-tetraalkylcyclobutane-1,3-diol is 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, 2,4-diethyl-2,4-diisoamylcyclobutane-1,3-diol or mixtures thereof.

4. The composition of claim 1 wherein the alkyl portion of said b) $C_2$-$C_{20}$ diol is branched or linear, saturated or unsaturated, aliphatic or cycloaliphatic and the hydroxyl group of said b) $C_2$-$C_{20}$ diol is primary, secondary or tertiary.

5. The composition of claim 1 wherein said b) $C_2$-$C_{20}$ diol is 2,2-dimethyl-1,3-propanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof.

6. The composition of claim 1 wherein the alkyl portion of said c) $C_2$-$C_{20}$ polyol is branched or linear, saturated or unsaturated, aliphatic or cycloaliphatic and having three or more hydroxyl groups and wherein the hydroxyl groups are primary, secondary, and/or tertiary.

7. The composition of claim 1 wherein said c) $C_2$-$C_{20}$ polyol has at least two primary hydroxyl groups.

8. The composition of claim 1 wherein said alicyclic diacid is a cyclic aliphatic dicarboxylic acid or diester derivative of a cyclic aliphatic dicarboxylic acid, or an anhydride derivative of a cyclic aliphatic dicarboxylic acid, or a combination thereof.

9. The composition of claim 1 wherein said alicyclic diacid is, 1-4-cyclohexanedicarboxylic acid, 1,3-cyclohexanedicarboxylic acid, hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

10. The composition of claim 1 wherein said acyclic aliphatic diacid is an open-chain aliphatic dicarboxylic acid compound, or a diester derivative of aliphatic dicarboxylic acid compound, or an anhydride derivative of aliphatic dicarboxylic acid compound, or a combination thereof.

11. The composition of claim 1 wherein said acyclic aliphatic diacids is adipic acid, maleic anhydride, maleic acid, fumaric acid, itaconic anhydride, itaconic acid, citraconic anhydride, citraconic acid, dodecanedioic acid, sebacic acid, azelaic acid.

12. The coating composition of claim 1 wherein said crosslinker is toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates and isocyanateterminated adducts of diols and polyols and mixtures thereof.

13. The coating composition of claim 1 further comprising one or more cross-linking catalysts present in the amount of about 0.01 to 5 weight percent based on the total weight of the resin solids in said coating composition.

14. The coating composition of claim 13 wherein said cross-linking catalyst is a tertiary amine, a tin compound or an organo-metallic compound or a mixture thereof.

15. The coating composition of claim 13 wherein said cross-linking catalyst is triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, I,8-diazabichloro[5,40]-undecene-7 N-methyl diethanolamine, N,N-dimethyl ethanolamine, N,N-diethyl cyclohexylamine, N,N,N'N'-tetramethyl-ethylene diamine, I,4-diaza-bicyclo-[2,2,2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-I,3-butanediamine, 1,2-dimethylimidazole, 2-methylimidazole, stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; zinc octoate, phenyl mercuric propionate, lead octoate, lead naphthenate, and copper naphthenate or a mixture thereof.

16. The coating composition of claim 1 wherein said solvent is a ketone, an aromatic compound, an acetate, mineral spirits, a naphtha or mixtures thereof.

17. The coating composition of claim 1 further comprising a UV inhibitor, a wetting agent, a flow agent, a defoamer, a flattening agent, a rheology control agent, an anti-settling agent, an anti-sag agents or slip agents or a combination thereof.

* * * * *